united States Patent Office 3,305,311
Patented Feb. 21, 1967

3,305,311
SLAKING PROCESS
Raymond P. Mayer and Robert A. Stowe, Ludington, Mich., assignors to The Dow Chemical Company, Midland, Mich., a corporation of Delaware
No Drawing. Filed Jan. 21, 1964, Ser. No. 339,086
8 Claims. (Cl. 23—188)

This invention relates to a novel method for slaking of calcined dolomite and limestones for use in the production of magnesium hydroxide from a brine containing magnesium chloride, and more particularly relates to an improved method of dry-slaking such materials.

In slaking either calcined limestone or dolomite with an amount of water sufficient merely to hydrate the calcium oxide portion thereof to the corresponding hydroxide and to dissipate the heat of reaction by evaporation as steam, essentially no excess free water is used in slaking by this process. Accordingly, slaking by this method is referred to herein as dry-slaking. The amount of water so-used, however, must, by means of proper equipment and conditions, be proportioned to the calcined material so as to obtain a substantially exact water-to-solid ratio to accomplish complete hydration (slaking) of the calcined material and effect at least a partial heat dissipation, without going beyond this requirement. Though the method of slaking using the aforesaid requisite amount of water is highly desirable and efficient, achieving and maintaining the exact water-to-solid ratio throughout the slaking operation is difficult in most instances. One method by which the requisite amount of water may be admixed with either calcined dolomite, called dolime, or, with calcined limestone, called lime, is by spraying the water onto the calcined material while it is revolving in a mixing-slaking drum. This slaking operation is essentially a "dry" one in that no aqueous slurry is produced and the slaked material emerges from the drum in a dry or damp condition as opposed to a slurry or mud. Proper flow rates, water input, and adequate mixing must be closely coordinated to successfully slake in this manner. Normally, this is difficult to do especially in a large scale continuous production.

An object of the present invention, therefore, is to provide an improved process for dry-slaking calcined dolomite and limestone which is simple, economical, and avoids the difficulties as set forth above.

It has been found, in accordance with the present invention, that by immersing porous dolime or lime particles in a pool of water for a particular period of time, and then withdrawing the so-treated material, just enough water absorbed both to hydrate the particles and to remove at least some of the heat of hydration, the heat removal being effected by evaporation as steam by that portion of the absorbed water not required for hydration. By so-immersing said particles, the correct amount of water needed for slaking is inherently obtained by absorption in the interstices of the porous particle, thus obviating any need for special metering means and coordination of material flow rates in order to obtain proper slaking. By this simple and economical process of merely immersing said calcined particles in a pool of the slaking liquid for a particular length of time to absorb the proper amount of water as aforesaid the above objects and advantages are readily obtained.

The improved dry-slaking process of the present invention, then, comprises in general immersing the porous dolime or lime particles to be slaked, as by dipping in a bath of a slaking liquid comprised essentially of water, for a period of time sufficient both to absorb an amount of water required for hydration and to absorb an amount of water to dissipate at least a substantial portion of the heat of reaction as latent heat of evaporation of water when subsequently withdrawn from the slaking liquid without significant break down in size of the particles while immersed. In actual practice the immersion time employed varies with the porosity of the material to be slaked and can readily be ascertained by one skilled in the art. Generally, an immersion time within the range of from about 3 to about 60 seconds has been found sufficient, with a time within the range of from about 4 to about 30 seconds being preferred. Promptly after immersion for the required time, the so-immersed particulated material is withdrawn, allowed to drain out of contact with the bath or pool, while unabsorbed liquid may be allowed to fall back into the bath or pool for reuse, if desired. During contact with the slaking liquid and primarily while draining, hydration occurs and the temperature of the material rises. A period, for example, of up to about 60 minutes accomplishes hydration, the heat of reaction being at least partially dissipated by evaporation as steam of that portion of the absorbed water not required for hydration. When immersed for such a period as stated above and withdrawn, the particles during hydration will normally attain a temperature within the range of from about 100° C. to about 150° C., depending upon the temperature of the starting materials and the pore volume relative to the quantity of calcium oxide present. During hydration, because of the porosity and heat generated by the reaction, the particles become dry and conveniently break down into fines and powders. Use of a longer immersion period than that specified above may result in break down of the particles within the pool of liquor. Such break down hinders the subsequent draining operation.

Preferably, the particles of the material to be slaked as above should be of a size such that about 90 percent are capable of being retained on a number 20 screen (U.S. Standard Sieve Series), there being as few fines and smaller particles as possible. In addition the particles should have a pore volume, that is, a capacity to absorb through the pores, a quantity of slaking liquor comprising at least about 0.40 g. and not more than about 1.5 g. of water per gram of calcium oxide in the dolime or lime and preferably 0.55 g. to about 0.95 g. water per gram of calcium oxide. In addition, though the dolime or lime must slake readily, the material must have a slaking activity such that hydration will not take place in less than about 3 seconds lest said slaking be too violent or explosive. It has been found that calcination of dolomite or limestone at a temperature between about 1300° C. and 1450° C. readily produces dolime or lime particles of sufficient porosity and slaking activity for safe and efficient use in the process of the present invention.

The following example will serve to further illustrate the invention.

*Example 1*

About 59.0 pounds of particulated dolime, having a CaO content of 34.2 pounds, which had been calcined from one half to 2 inch diameter dolomite stone in a kiln at a temperature of about 1400° C. and having a particle size such that about 90 percent of said particles were capable of being retained on a number 20 screen, were placed in a rectangular wooden frame having dimensions of 24″ x 18″ x 6″, a handle and a screened bottom capable of retaining the particles in the frame, the dolime bed in the frame being about 5 inches thick. The frame and dolime therein were submerged in a pool of water for about 20 seconds, whereupon, the frame and wetted contents were lifted out of the water and said contents allowed to drain for about 40 seconds. The drained, wetted dolime (82 pounds) was then held in the frame for about 1 hour while the dolime slaked and steam was evolved during which time a temperature in the material of about 135° C. was reached. Following slaking, the frame was inverted to discharge the hydrated contents (70 pounds) which tested dry and pulverulent and were found to be suitable for use as a precipitant in preparing magnesium hydroxide from brines containing magnesium chloride.

In a manner similar to the foregoing an immersion time with the range of from about 4 to about 30 seconds may also be employed to obtain an effectively slaked dolime or lime material.

Various modification can be made in the present invention without departing from the spirit or scope thereof and it is understood that we limit ourselves only as defined in the appended claims.

We claim:

1. A process for dry slaking a porous lime-containing material selected from the group consisting of dolime and lime comprising, submerging the porous material in a pool of essentially water for a period of time only to wet it and absorb a sufficient amount of water during immersion sufficient upon withdrawal to hydrate the CaO in the material to $Ca(OH)_2$ and to dissipate at least in part the heat of hydration by evaporation of a portion of the absorbed water as steam, withdrawing the wetted material from the pool, draining the unabsorbed liquid from the material, and holding the material for a period of time sufficient to allow substantially all the hydration of the CaO in the material and dissipate the heat of reaction at least partially by evolution of steam.

2. The process of claim 1 wherein the material to be treated is submerged for a period of time within the range of from about 3 to 60 seconds.

3. The process of claim 1 wherein the drained material is held while hydrating for a period of time up to about 60 minutes.

4. The process of claim 1 wherein at least about 90 percent of the particles of material to be treated are capable of being retained on number 20 screen.

5. The process of claim 1 wherein the material to be treated is submerged for a period within the range of from about 4 to about 30 seconds.

6. The process of claim 1 wherein the porous particles are submerged such that an amount of water within the range of from about 0.4 gram to about 1.5 grams per gram of CaO in the lime-containing material is absorbed.

7. A process for dry slaking a porous lime-containing material selected from the group consisting of dolime and lime comprising the steps of, submerging the porous material in a pool of water for a period of time within the range of from about 3 to about 60 seconds to absorb an amount of water within the range of from about 0.4 to about 1.5 grams of water per gram of CaO in the lime-containing material, withdrawing the material so-absorbed with water to drain the unabsorbed water therefrom, and holding the withdrawn material for a period up to about 60 minutes sufficient to allow hydration of the CaO in the said material and dissipate the heat of reaction at least partially by evolution of steam.

8. The method of claim 7 wherein the amount of water absorbed is within the range of from 0.55 to about 0.95 gram per gram of CaO in the material.

References Cited by the Examiner

FOREIGN PATENTS 638,694   3/1962   Canada.

OSCAR R. VERTIZ, *Primary Examiner.*

J. J. BROWN, *Assistant Examiner.*